United States Patent
Bressan

(10) Patent No.: US 7,747,082 B2
(45) Date of Patent: Jun. 29, 2010

(54) JPEG DETECTORS AND JPEG IMAGE HISTORY ESTIMATORS

(75) Inventor: Marco Bressan, La Tronche (FR)

(73) Assignee: Xerox Corporation, Norwalk, CT (US)

( * ) Notice: Subject to any disclaimer, the term of this patent is extended or adjusted under 35 U.S.C. 154(b) by 1260 days.

(21) Appl. No.: 11/242,580

(22) Filed: Oct. 3, 2005

(65) Prior Publication Data
US 2007/0076959 A1    Apr. 5, 2007

(51) Int. Cl.
    G06K 9/62    (2006.01)
    G06K 9/36    (2006.01)
(52) U.S. Cl. ................................ 382/224; 382/232
(58) Field of Classification Search ............. 382/224, 382/232
See application file for complete search history.

(56) References Cited

U.S. PATENT DOCUMENTS

| | | | |
|---|---|---|---|
| 5,398,066 A * | 3/1995 | Martinez-Uriegas et al. | 375/240.25 |
| 5,862,260 A * | 1/1999 | Rhoads | 382/232 |
| 5,867,598 A * | 2/1999 | de Queiroz | 382/235 |
| 6,081,211 A | 6/2000 | de Queiroz et al. | |
| 6,385,342 B1 | 5/2002 | de Queiroz | |
| 6,426,771 B1 * | 7/2002 | Kosugi | 348/222.1 |
| 6,504,494 B1 * | 1/2003 | Dyas et al. | 341/50 |
| 6,628,843 B1 | 9/2003 | Eschbach et al. | |
| 6,697,107 B1 | 2/2004 | Hamilton et al. | |
| 7,551,755 B1 * | 6/2009 | Steinberg et al. | 382/118 |
| 2002/0191701 A1 | 12/2002 | O'Brien, Jr. et al. | |
| 2004/0066966 A1 * | 4/2004 | Schneiderman | 382/159 |
| 2004/0125400 A1 * | 7/2004 | De Graaff et al. | 358/1.15 |
| 2004/0136600 A1 * | 7/2004 | Yfantis | 382/232 |

FOREIGN PATENT DOCUMENTS

| | | |
|---|---|---|
| EP | 0769878 A2 | 4/1997 |
| EP | 1001608 A | 5/2000 |
| EP | 1017239 A | 7/2000 |
| WO | WO 01/20912 A | 3/2001 |

OTHER PUBLICATIONS

JPEG compression history estimation for color images Neelamani, R.; de Queiroz, R.; Zhigang Fan; Baraniuk, R.; Image Processing, 2003. ICIP 2003. Proceedings. 2003 International Conference on vol. 3, Sep. 14-17, 2003 pp. III—245-248 vol. 2.*

Neelamani et al., "JPEG Compression History Estimation for Color Images," IEEE, Intnl. Conference on Image Processing, NY, vol. 2 of 3, pp. 245-248, 2003.

(Continued)

Primary Examiner—Brian P Werner
Assistant Examiner—Michael Vanchy, Jr.
(74) Attorney, Agent, or Firm—Fay Sharpe LLP

(57) ABSTRACT

An image is classified respective to JPEG compression history. An image signature is derived from the image. The image signature is indicative of spatial frequencies content of chrominance components of the image including spatial frequencies content associated with JPEG compression. The image is classified respective to whether the image has undergone JPEG compression based on analysis of the image signature.

25 Claims, 4 Drawing Sheets

OTHER PUBLICATIONS

Algazi et al., "Improving the Quality of Coded Still Images by Post-Processing," Proceedings of the SPIE, vol. 2663, pp. 168-176, 1996.
Fan et al., "Identification of Bitmap Compression History: JPEG Detection and Quantizer Estimation," IEEE Transactions on Image Processing, vol. 12, No. 2, pp. 230-235, 2003.
Minami et al., "An Optimization Approach for Removing Blocking Effects in Transform Coding," IEEE Transactions on circuits and Systems for Video Technology, vol. 5, No. 2, pp. 74-82, 1995.
Tan et al., "Blockiness Detection for MPEG2-Coded Video," IEEE Signal Processing Letters, vol. 7, No. 8, pp. 213-215, 2000.

* cited by examiner

JPEG DETECTORS AND JPEG IMAGE HISTORY ESTIMATORS

BACKGROUND

The following relates to the digital image arts. It particularly relates to identifying whether an image history includes a JPEG compression stage, and will be described with particular reference thereto. However, the following is also applicable to determining the JPEG quality or extent of JPEG compression employed during the JPEG compression stage or stages of the image history, and to other like applications.

Digital images are stored in various formats, including for example GIF, JPEG, TIFF, PCX, BMP, PNG, and so forth. Each format has its own advantages and disadvantages. For example, some formats are proprietary and may require licensing. Digital image formats can employ either lossless or lossy compression, or no compression whatsoever. Thus, selection of digital image format also entails balancing image quality versus file size. An image can also change its format along its lifecycle. For example, an image acquired in one format can be converted to a different format for storage, or an image can be converted to a different format for insertion into a printing data stream, or so forth.

JPEG is an open format developed by the Joint Pictures Expert Group (the JPEG image format is named after the acronym of its creating group). The JPEG format is the most common image format used for digital image storage and distribution. For example, it has been estimated that approximately 60% of images on the Internet are in JPEG format. A majority of digital cameras, scanners, cellphone cameras, and other consumer electronics for generating digital images provide output in JPEG format.

JPEG employs lossy compression. A typical JPEG compression sequence includes: (i) transformation of the image to a luminance/chrominance color space such as YUV, YIQ, or so forth; optional down-sampling typically applied to the chrominance components; blocking of pixels into 8×8 pixel blocks or otherwise-sized blocks; transforming each component within each block using a discrete cosine transform (DCT) to convert to spatial frequencies; quantization of the frequencies to scaled integer values to provide a first, lossy level of compression; performing a second, typically lossless level of compression using Huffman coding, arithmetic coding, or so forth; and construction of suitable file headers containing quantization tables, Huffman coding tables, or other information employed in subsequent image decompression.

The amount of loss in the JPEG compression is generally related to the coarseness or fineness of the quantization. Using large quantization coefficients followed by rounding off to the nearest integer causes large rounding errors and substantial information loss. By comparison, using smaller quantization coefficients for compressing the same image, followed by rounding, causes smaller rounding errors and less information loss. Because the visual image quality is typically more strongly influenced by luminance than by chrominance, larger quantization coefficients are typically used in quantization of the chrominance components as compared with the luminance component. Typically, photo editing software and consumer products provide the user with "image quality" parameters for selecting the quantization coefficients. For example, a "high image quality" mode will use generally smaller quantization coefficients versus a "low image quality" mode.

After JPEG compression, the image may be stored as a JPEG file, or may be converted to another image format. Such image format conversion retains the information loss introduced by the lossy JPEG compression. Moreover, a digital image may be JPEG compressed, then uncompressed and communicated through a printing pipeline or other data transmission pathway in which the digital image loses its identity as a named file of the JPEG type. In such cases, it is not clear whether the digital image has undergone JPEG compression at some point in its history.

There are advantages to knowing whether a digital image has undergone JPEG compression at some point in its history. For example, image quality can be improved by smoothing or otherwise mitigating image artifacts introduced by the lossy JPEG compression. However, image processing techniques that are advantageous for reducing JPEG artifacts can degrade image quality when applied to an image that has never undergone JPEG compression.

Another advantage to knowing whether an image has undergone JPEG compression is that the image quality of the compressed JPEG format provides a baseline image quality for later compression and image storage operations. If an image is known to have undergone JPEG compression of a certain JPEG quality, then the image can be re-compressed at least to that JPEG quality level with substantially no further image quality degradation. Thus, knowledge of the JPEG compression history enables selection of an optimal compression level for later image processing.

Yet another advantage to knowing the JPEG compression history, if any, of a digital image relates to image history estimation. Estimating an image history is advantageous for efficient image storage and retrieval, and is also advantageous from an intellectual property standpoint.

Although it is useful to know whether an image has undergone JPEG compression, making that determination for a particular digital image can be difficult when the digital image is in a non-JPEG format, is part of a print data stream, or so forth. It is difficult to determine whether a presently non-JPEG image has in the past undergone JPEG compression. The difficulty in making this determination increases when the image has undergone post-conversion processing such as cropping, re-sizing, printing followed by optical scanning, or so forth. Although such a converted (and possibly post-conversion-processed) digital image is no longer in JPEG format, it generally retains image artifacts introduced by the JPEG compression.

CROSS REFERENCE TO RELATED PATENTS AND APPLICATIONS

De Queiroz, U.S. Pat. No. 6,385,342, entitled "Blocking Signature Detection for Identification of JPEG Images", is assigned to Xerox Corporation and is incorporated herein by reference in its entirety. This patent, among other aspects, describes example JPEG compression processing and presents methods for detecting whether a digital image has undergone JPEG compression. In some such methods disclosed in the de Queiroz U.S. Pat. No. 6,385,342 patent, a block grid within the image is determined, differences are computed between samples inside the established blocks and between samples across the established blocks, and a determination of whether the image has been JPEG-compressed is made based on characteristics derived from statistics of the computed differences.

BRIEF DESCRIPTION

According to aspects illustrated herein, there is provided a method for classifying an image respective to JPEG compression history. An image signature is derived from the image. The image signature is indicative of spatial frequencies content of chrominance components of the image including spatial frequencies content associated with JPEG compression. The image is classified respective to whether the image has undergone JPEG compression based on analysis of the image signature.

According to aspects illustrated herein, there is provided an apparatus for classifying an image respective to whether the image has undergone JPEG compression. An image signature deriver derives a spatial frequency-based image signature from the image. A classifier classifies the image respective to whether the image has undergone JPEG compression based on analysis of the spatial frequency based image signature.

According to aspects illustrated herein, there is provided an image classification method. A spatial frequency-based image signature is derived from the image. The image is classified respective to whether the image has undergone JPEG compression based on the spatial frequency-based image signature.

BRIEF DESCRIPTION OF THE DRAWINGS

FIG. 2A plots the image signature for the image never having undergone JPEG compression;

FIG. 2B plots the image signature after the image has undergone JPEG compression with relatively higher JPEG quality setting of Q=97% (relatively less compressed); and FIG. 2C plots the image signature after the image has undergone JPEG compression with relatively lower JPEG quality setting of Q=80% (relatively more compressed).

DETAILED DESCRIPTION

Figure 1:
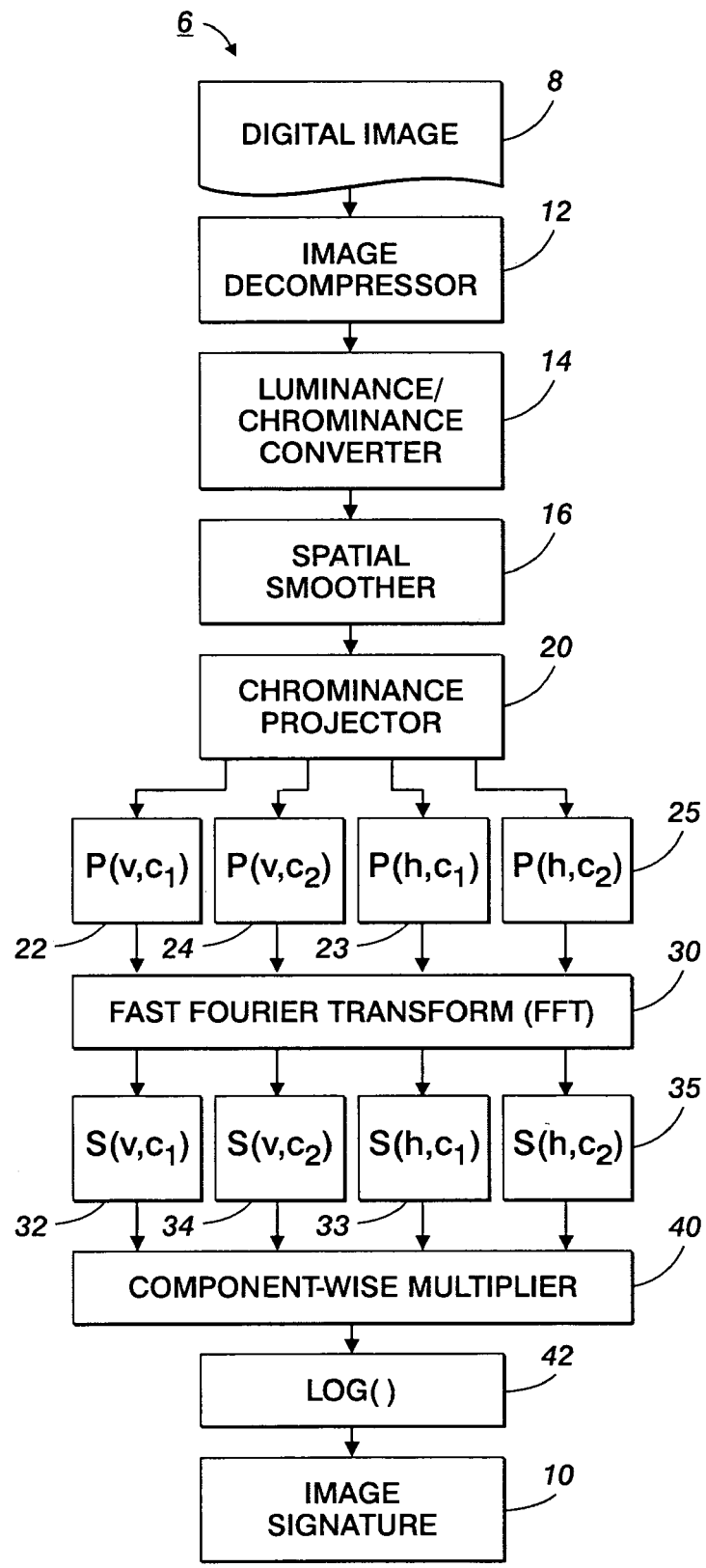
FIG. 1 diagrammatically shows derivation of an image signature indicative of whether the image has undergone JPEG compression.

With reference to FIG. 1, a digital signature deriver 6 processes a digital image 8 to derive an image signature 10 therefrom that is indicative of whether the image has undergone JPEG compression. The digital signature deriver 6 derives a digital signature that represents spatial frequencies of the image chrominance channels, optionally with suppression of spatial frequencies attributable to image features other than JPEG compression artifacts. Without being limited to any particular theory of operation, it is believed that if the image has undergone JPEG compression then such a frequency-based image signature will typically exhibit discernable spectral features corresponding to the 8×8 pixel blocks or otherwise-sized pixel blocks defined as part of the JPEG compression process. The strength of such features is expected to be indicative of the aggressiveness of the JPEG compression, and hence the extent of information loss.

Moreover, if at some time after JPEG compression the image was been resized, cropped, or otherwise processed in a way which modifies the pixel density, then the frequency of the JPEG artifact features in the image signature may correspond to something other than 8×8 pixel blocks or otherwise-sized JPEG pixel blocks. Accordingly, the frequency values of JPEG artifact features in the image signature is expected to be indicative of the image size, measured in pixels, at the time of the JPEG compression. JPEG blocking artifacts usually occur at frequencies corresponding to $2^n$ where n is an integer. Accordingly, if JPEG blocking artifacts occur at other frequencies, this can indicate resizing subsequent to the JPEG compression.

With continuing reference to FIG. 1, if the digital image 8 is in a compressed format employing a compression method other than JPEG, then an image decompressor 12 decompresses the digital image based on the compression scheme used in the digital image 8, so as to produce an uncompressed image.

If the uncompressed image is in represented in an RGB, CMYK, or other color space that is not a luminance/chrominance color space, then the uncompressed image is preferably processed by a luminance/chrominance converter 14 that converts the uncompressed image to a luminance/chrominance color space such as YUV, YIQ, or so forth. In typical luminance/chrominance color spaces, one color space component corresponds to the luminance or brightness component (e.g., the "Y" component in YUV or YIQ color space), while two additional color space components correspond to chrominance components (e.g., the "U" and "V" components in YUV color space, orthe "I" and "Q" components in YIQ color space). For example, RGB is suitably converted to YUV by computing the luminance ("Y") component as a weighted sum of the "R", "G", and "B" components of the RGB color space, and by computing the chrominance components ("U" and "V") as weighted differences between selected "R", "G", and "B" components.

Conversion to a luminance/chrominance color space is advantageous because JPEG compression is typically performed in luminance/chrominance color space and typically applies more aggressive, and hence more lossy, compression of the chrominance components compared with the luminance component. Accordingly, it is expected that JPEG compression artifacts are more pronounced in the chrominance components as compared with the luminance component. However, it is also contemplated to omit conversion to luminance/chrominance color space, in which case the digital signature deriver 6 suitably operates in another type of color space such as an RGB or CMYK color space.

The uncompressed image in luminance/chrominance color space is optionally processed by a spatial smoother 16 that suppresses features of the chrominance components that are attributable to large spatial gradients in the luminance component. A feature of the chrominance components that spatially corresponds with a large spatial gradient of the luminance component is likely to be an image feature, rather than a JPEG compression artifact. In some embodiments, the spatial smoother 16 smooths each chrominance component along high values of the luminance gradient. In other embodiments, the spatial smoother 16 performs smoothing by weighting the chrominance components using spatially varying weighting factors that correspond to an inverse of the corresponding luminance gradient. These smoothing techniques typically suppress the effect of luminance edges on the chrominance components, while substantially preserving chrominance features attributable to JPEG artifacts such as blocking artifacts caused by the grouping of pixels into 8×8 pixel groups or otherwise-sized pixel groups during the JPEG compression processing.

A chrominance projector 20 projects the first chrominance component gradient (denoted herein as "$c_1$", for example corresponding to the "U" component of the YUV color space or the "I" component of the YIQ color space) along the vertical and horizontal directions of the image to produce a vertical first chrominance component projection vector $P(v, c_1)$ 22 and a horizontal first chrominance component projection vector $P(h,c_1)$ 23, respectively. Similarly, the chrominance projector 20 projects the second chrominance component gradient (denoted herein as "$c_2$", for example corresponding to the "V" component of the YUV color space or the "Q" component of the YIQ color space) along the vertical and horizontal directions of the image to produce a vertical second chrominance component projection vector $P(v,c_2)$ 24 and a horizontal second chrominance component projection vector $P(h,c_2)$ 25, respectively. For images that have undergone JPEG compression, it is expected that these projection vectors 22, 23, 24, 25 will exhibit spectral features corresponding to the 8×8 pixel blocking or otherwise-sized pixel blocking employed in the JPEG compression. The spatial frequency of the JPEG artifacts may or may not correspond to the pixel blocking size used in the JPEG compression if the image was resized or otherwise had the pixel density modified at some time after undergoing the JPEG compression.

To extract the spatial frequencies of the projection vectors 22, 23, 24, 25, a fast Fourier transform (FFT) 30 is used to compute N-point power spectra 32, 33, 34, 35 corresponding to the projection vectors 22, 23, 24, 25. The projection vector $P(v,c_1)$ 22 is transformed to produce a power spectrum $S(v,c_1)$ 32. The projection vector $P(h,c_1)$ 23 is transformed to produce a power spectrum $S(h,c_1)$ 33. The projection vector $P(v,c_2)$ 24 is transformed to produce a power spectrum $S(v,c_2)$ 34. The projection vector $P(h,c_2)$ 25 is transformed to produce a power spectrum $S(h,c_2)$ 35. It is typically sufficient to preserve the first N/2 points of each of the computed N-point power spectra 32, 33, 34, 35. One or more of the power spectra 32, 33, 34, 35 are multiplied component-wise by a component-wise multiplier 40. In another approach, one or more of the projection vectors 22, 23, 24, 25 are first convolved and then FFT processed; however, performing the FFT 30 first and then component-wise multiplying 40 the power spectra (taking advantage of the equivalence between convolution in real space and multiplication in frequency space) is typically computationally more efficient. Convolving the projection vectors (or, equivalently, component-wise multiplying the power spectra) is expected to suppress convolutional noise and enhance the power of JPEG blocking artifact frequencies. In some embodiments, the output of the component-wise multiplier 40 is used as the image signature; however, in the embodiment illustrated in FIG. 1, a logarithm processor 42 is applied to the output of the component-wise multiplier 40 to produce the image signature 10 with reduced dynamic range.

FIG. 1 depicts an example approach for deriving a digital signature providing a spectral representation of the digital image 8. Other techniques can be employed. For example, rather than convolving or employing point-wise component multiplication, the power spectra can be concatenated to form an image signature. The FFT can be replaced by a discrete cosine transform, a discrete sine transform, or other frequency-type transform for producing image spectra. Moreover, the digital signature can be the result of additional processing applied to the spectral representation, such as principal components analysis (PCA) or other features analysis that produces a spectrally-based digital signature of reduced dimensionality. Still further, the digital signature can include a spectral representation of the luminance or another component of the digital image.

Figure 2A:
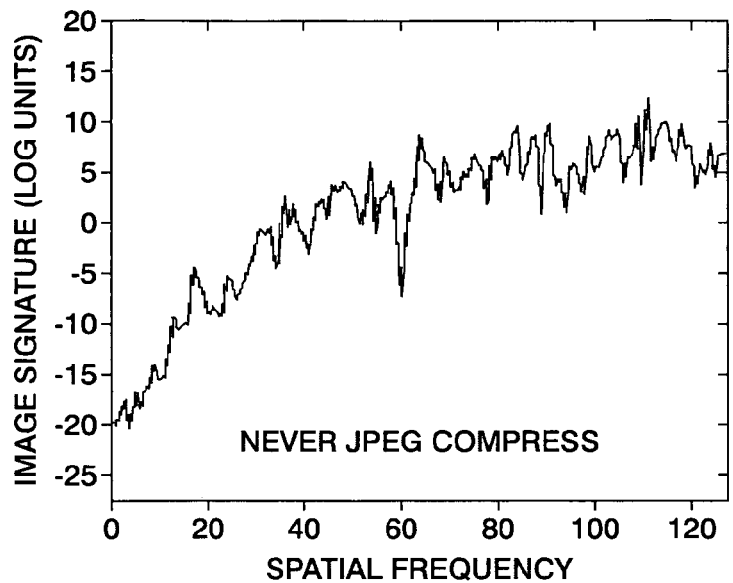
FIGS. 2A, 2B, and 2C plot image signatures derived in accordance with FIG. 1 for a digital image having undergone various levels of JPEG compression or no JPEG compression.
Figure 2B:
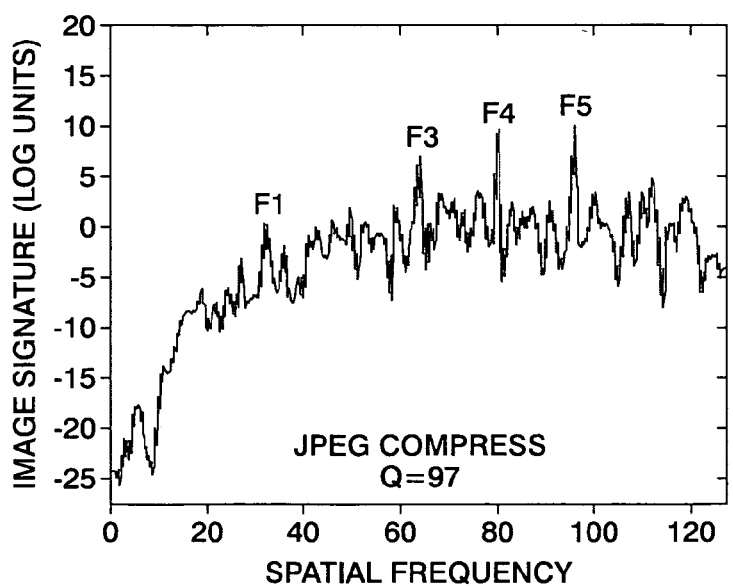
Figure 2C:
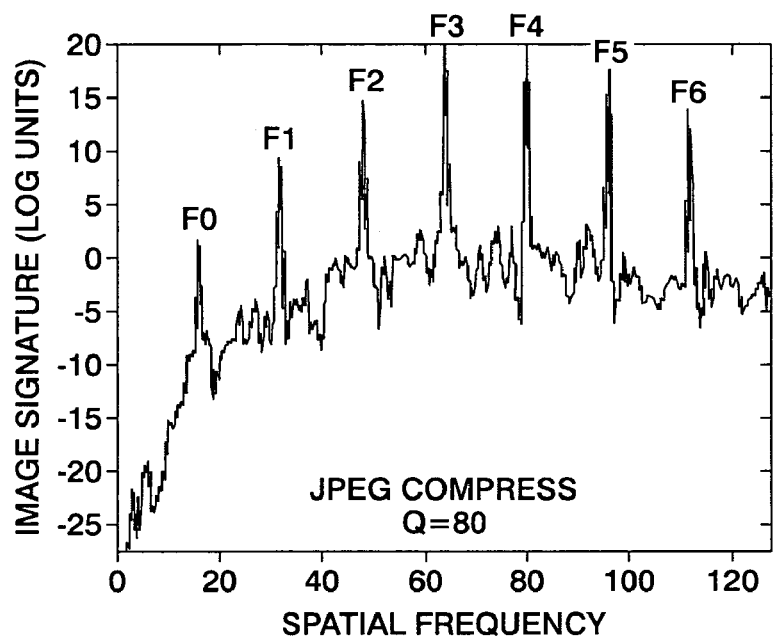

With reference to FIGS. 2A, 2B, and 2C, the effectiveness of the image signature 10 for detecting JPEG compression artifacts, and hence for detecting the underlying prior JPEG compression processing, is shown for an example continuous-tone color image having relatively high luminance and chrominance component frequencies. FIG. 2A plots the image signature for the image never having undergone JPEG compression. The image signature is substantially smooth, and does not exhibit features associated with JPEG compression. FIG. 2B plots the image signature after the image has undergone JPEG compression using 8×8 pixel blocking with relatively high JPEG quality setting (denoted "Q") of Q=97%. The image signature for this relatively low-compressed image shows four visually discernable features labeled "F1", "F3", "F4", and "F5" associated with the JPEG compression. FIG. 2C plots the image signature after the image has undergone JPEG compression with relatively lower JPEG quality setting of Q=80% (relatively more compressed). The image signature for this relatively higher-compressed image shows more pronounced versions of the same four JPEG compression features "F1", "F3", "F4", and "F5" discernable in FIG. 2B, and additionally shows three more visually discernable JPEG compression features "F0", "F2", and "F6". The seven visually discernable features "F0", "F1", "F2", "F3", "F4", "F5", and "F6" of FIG. 2C are periodic with a periodicity of about 16 frequency units.

The image signature 10 can be used for automated classification as to whether an image has undergone JPEG compression. A classifier analyzes the image signature 10 to make the determination as to whether the image has undergone JPEG compression. The classifier can use various approaches for discriminating based on the image signature 10 whether the image has undergone JPEG compression.

Figure 3:
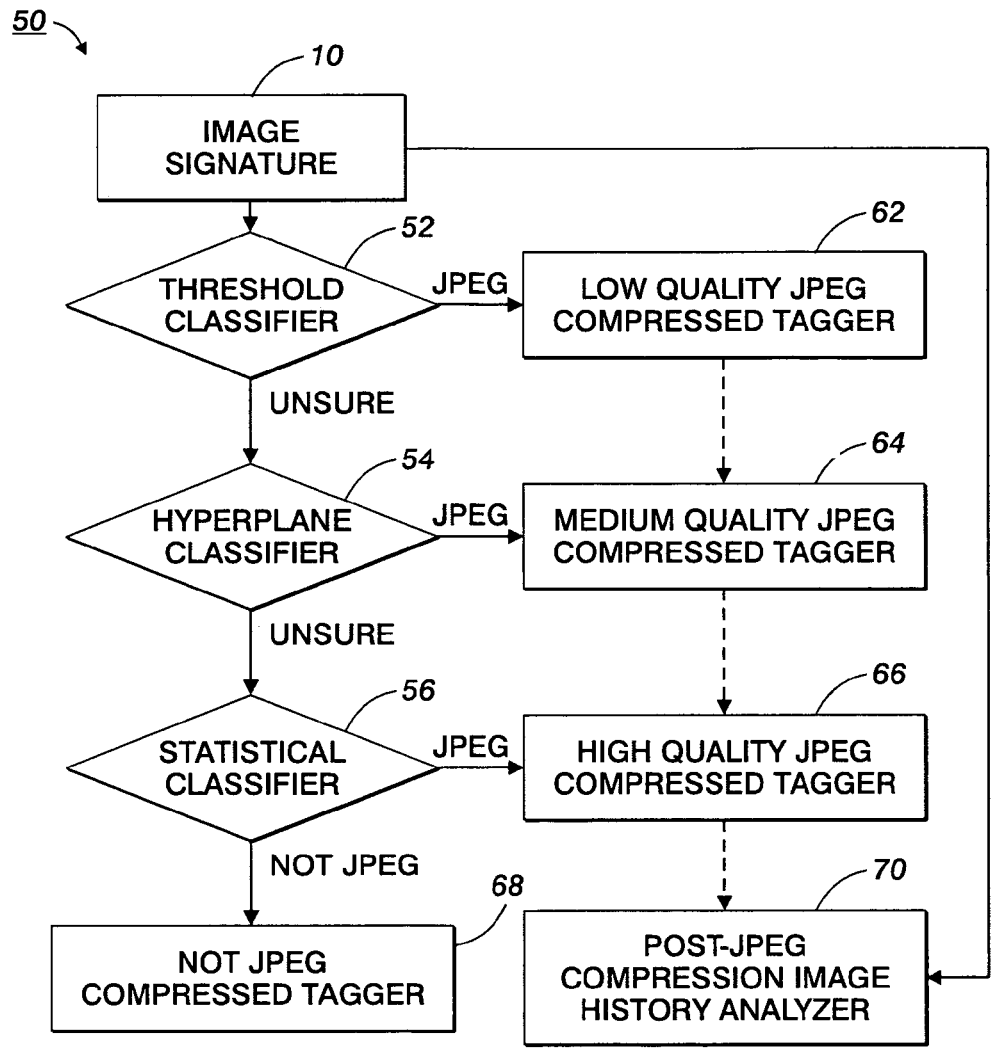
FIG. 3 diagrammatically shows a cascaded JPEG compression classifier operating on the image signature derived in accordance with FIG. 1.

With reference to FIG. 3, an example classifier 50 employs a cascaded classifier having three cascaded classification stages 52, 54, 56. The three cascaded classification stages 52, 54, 56 employ selection criteria that are increasingly biased toward concluding that the image has undergone JPEG compression. For example, the first classifier stage 52 only classifies the image as having undergone JPEG compression if the image signature 10 includes a clear indication of JPEG blocking artifacts. Such a clear indication of JPEG blocking artifacts is typically expected to occur only if the image was aggressively compressed, leading to substantial information loss and strong JPEG artifacts. Accordingly, if the first classifier stage 52 determines that the image has undergone JPEG compression, then a first stage tagger 62 tags the image as having undergone JPEG compression at some point in its history. In some embodiments, the tagger 62 tags the image as low quality JPEG, indicating that the image has undergone aggressive lossy JPEG compression and hence is of relatively low quality due to the introduced strong JPEG artifacts.

The second classifier stage 54 only operates on the image if the first stage classifier 52 was unsure whether the image had undergone JPEG compression. The second classifier stage 54 employs a selection criterion more biased toward concluding that the image has undergone JPEG compression compared with the first classifier stage 52. Accordingly, if the second classifier stage 54 determines that the image has undergone JPEG compression, then a second stage tagger 64 tags the image as having undergone JPEG compression. In some embodiments, the tagger 64 tags the image as a medium quality JPEG, indicating that the image has undergone JPEG compression of medium quality.

The third classifier stage 56 only operates on the image if the first and second stage classifiers 52, 54 were both unsure whether the image had undergone JPEG compression. The third classifier stage 56 employs a selection criterion more biased toward concluding that the image has undergone JPEG compression compared with the first and second classifier stages 52, 54. Accordingly, if the third classifier stage 56 determines that the image has undergone JPEG compression, then a third stage tagger 66 tags the image as having undergone JPEG compression. In some embodiments, the tagger 66 tags the image as a high quality JPEG, indicating that the image has undergone less aggressive JPEG compression and accordingly is of high quality and includes few JPEG compression artifacts.

On the other hand, if the third classifier stage 56 also is unable to conclude that the image has undergone JPEG compression, then it is concluded that the image has not undergone JPEG compression, and a terminal tagger 68 tags the image as having never undergone JPEG compression.

The JPEG compression history identification problem comports well with the use of cascaded classifier schemes in which successive stages gradually specialize on images with less aggressive JPEG compression (that is, higher image quality). In addition cascaded classifier schemes also allow for good computational performance by linking the computational cost of classification to the JPEG quality. In suitable cascaded embodiments, each of the classifier stages in the cascade includes a classifier which only labels those samples it has high certainty of not getting wrong. If a classifier stage is not sure whether the image has undergone JPEG compression, it forwards the image signature to the next classifier stage in the cascade, where a more complex classifier is applied.

In some embodiments, the classifier stages are trained using machine learning techniques. Using a set of image signatures obtained from both compressed and uncompressed sample images, the classifier is trained to distinguish those which have been compressed (positive samples) from those which haven't (negative samples). In performing the machine learning, it is recognized that images that have undergone aggressive JPEG compression (that is, low quality JPEG images) should typically be relatively easy to identify as having undergone aggressive JPEG compression. This is seen, for example, by comparing the image signature of FIG. 2C, corresponding to aggressive JPEG compression, with the image signatures for less aggressively JPEG compressed or uncompressed images. The JPEG compression artifact features "F0", "F1", "F2", "F3", "F4", "F5", "F6" are readily discerned in FIG. 2C. Training of the classifier stages is also facilitated by ready access to positive samples of varying compression level. Given an uncompressed training image, substantially any number of positive samples of different compression levels can be obtained by, for example, randomly compressing the image. Moreover, additional positive training images can be obtained by randomly cropping or otherwise processing the image after JPEG compression.

If the images to be classified have characteristics in common, then the training set used for training the classifier is optionally limited to training images having those characteristics. For example, a classifier that is to be used for classifying scanned images is advantageously trained using a training set including mostly scanned images. Training using a broader set of training images will also work, but may produce a less effective classifier as compared with training using the more limited set of training images. It will be appreciated that the same classifier 50 can have varying characteristics depending upon the training set used. Machine learning enables automatic training for non-standard situations such as processing other than resizing or cropping, by using a training set that is tailored to the characteristics of the images that are expected to be classified.

Moreover, in some embodiments, the training of the classifier stages 52, 54, 56 employs different sets of training images. For example, it may be advantageous to first train the first classifier stage 52 using a set of training images. After the first classifier stage 52 is trained, the second stage classifier 54 is trained using only those training images that are not classified as having undergone JPEG compression by the trained first stage classifier 52. Thus, the second stage classifier 54 is trained using the sub-set of more difficult training images that would be passed through the trained first classifier stage 52 in actual operation. Similarly, the third stage classifier 56 is trained only on the sub-set of most difficult training images that are not classified as having undergone JPEG compression by either of the lower stage trained classifiers 52, 54.

A cascaded classifier such as the example three-stage cascaded classifier 50 of FIG. 3 optionally provides an estimation of JPEG quality. For example, the classifier 50 indicates high, medium, or low JPEG quality based upon which of the taggers 62, 64, 66 identifies the image as having undergone JPEG compression. The effectiveness of a cascaded classifier for determining the quality of the JPEG image (as opposed to its effectiveness for determining whether the image has undergone JPEG compression of arbitrary image quality) is dependent upon correlation between JPEG image quality and the ability of the lower stage classifiers 52, 54 to determine whether the image has undergone JPEG compression. For classifiers trained using a training set including a broad range of many types of images, this correlation may be weak, because other factors such as image complexity, image contrast characteristics, and so forth can also affect the ease or difficulty with which the lower stage classifiers 52, 54 can determine whether the image has undergone JPEG compression. On the other hand, classifiers trained using a more limited training set that includes less diverse, that is, more similar, training images may be more effective at determining JPEG quality, since the overall similarity of the images provides fewer extraneous factors that can affect how easily the lower stage classifiers 52, 54 determine whether the image has undergone JPEG compression.

Substantially any type of classification technique or algorithm can be employed for the classifier stages, and different classifier stages in the cascade can use different classification algorithms. In some embodiments, the initial classifier stages employ classifier algorithms which are computationally simple and which can determine a large number of positives at a low or even zero false negative rate. This is computationally efficient, because digital images that are easily classified as having undergone JPEG compression are identified at the computationally efficient initial classifier stages, and the more computationally intense higher classifier stages are only invoked for digital images that are difficult to classify. Moreover, a non-cascaded (that is, single-stage) classifier can be used. Suitable classifier algorithms for a single-stage classifier or for stages of a cascaded classifier include, for example, metric classifiers, statistical classifiers, neural nets, maximum margin classifiers such as support vector machines, or so forth. Moreover, different features can be used for classifying at different stages of the cascade using feature selection or feature extraction techniques.

In one specific embodiment of the three-stage classifier shown in FIG. 3: (i) the first classifier stage 52 employs a threshold counting power spectrum outliers; (ii) the second classifier stage 54 employs a hyperplane classifier algorithm trained via a neural net (such as a perceptron) or using Fisher Discriminant Analysis; and (iii) the third classifier stage 56 employs a statistical classifier using semi-parametric estimation of the conditional probabilities (such as Gaussian Mixture Models). Using a statistical classifier for the last classifier stage advantageously provides a probability measure of the detection of JPEG compression. Different problems can be faced by changing this probability measure, depending upon whether it is desired to limit false positive rates or to limit false negative rates.

Optionally, a post-JPEG compression image history analyzer 70 determines whether the image has been re-sized at some time after JPEG compression, based on the image signature 10. The image size is suitably estimated based on the frequency value or values of the JPEG artifacts in conjunction with a priori knowledge of the block size used during JPEG compression. For example, if the JPEG block size is known to be 8×8 pixels but the JPEG artifacts of the image signature are at frequencies corresponding to a 16×16 pixel block size, then it is likely that the digital image has been isotropically enlarged by a factor of two at some time after the JPEG compression. Typically, JPEG compression employs 8×8 pixel blocking by default; however, some JPEG compression systems allow this default to be overridden. In some embodiments, the JPEG compression pixel block size is assumed to be 8×8 pixels, or is assumed to be another block size characteristic of the images to be classified. With this assumption, image re-sizing subsequent to JPEG compression can be quantitatively estimated.

If the JPEG compression pixel block size is unknown, the post-JPEG compression image history analyzer 70 optionally provides useful information about historical image re-sizing, if any, subsequent to the JPEG compression. For example, JPEG blocking artifacts are expected to occur at frequencies that are powers of 2, that is, at frequencies of $2^n$ where n is a positive integer. Hence, if the JPEG blocking artifacts of the image signature occur at frequencies other than $2^n$ then it is known that the digital image has been re-sized at some time after JPEG compression, even though the re-sizing cannot be quantitatively determined. Moreover, if it is assumed that the JPEG blocking was isotropic, that is, was n×n pixels where n is a positive integer, then different JPEG blocking artifact frequencies for the horizontal and vertical directions indicate that the image has been stretched or otherwise non-isotropically re-sized. For the example digital signature 10 which is a convolved or component-wise multiplied version of the vertical and horizontal chrominance projections, the presence of two distinguishable blocking artifact frequencies in the digital signature 10 indicates some non-isotropic re-sizing has occurred subsequent to JPEG compression, but does not indicate the orientation (such as whether the vertical has been stretched relative to the horizontal or vice versa).

One complicating issue in assessing whether an image has undergone JPEG compression is the possibility that the image has been rotated at some time in its history subsequent to the JPEG compression. The JPEG assessment techniques disclosed herein inherently operate on images rotated by integer multiples of 90° (such as 90°, −90°, 180°, 270°, 450°, and so forth) since such rotations align with the horizontal and vertical blockings employed in JPEG compression. Rotations of other angles are more problematic as the horizontal and vertical projections used for the image signature no longer align with the JPEG blocking. In certain scanning applications, small rotations are typical, for example due to slight angular misplacement of a document on a document feeder tray or optical scanning window. In one suitable approach for accounting for small-angle rotations, a series of rotated images are input to the JPEG assessment algorithm. For example, each image can be input twenty times, with rotations ranging from for example −10° to +10° degrees by 1° steps. If any of the rotated images is classified as a JPEG, then the original image can be assumed to have undergone JPEG compression. Combinations of the image signatures across different degrees of rotation can be fed to the classifier, provided it has been trained on the same features. It is contemplated for the post-JPEG compression image history analyzer 70 to quantitatively estimate the cumulative angle of post-JPEG compression image rotation based on which of the rotated images is more easily classified as having undergone JPEG compression. It is further contemplated to use this quantitative information to automatically correct the image for rotation errors introduced by misplacement of hard copy images on an optical scanner or scanner document feeder, or so forth. For example, if the post-JPEG compression image history analyzer 70 determines that the image is rotated +50°, then a −5° rotation can be applied to the image to correct for the +5° rotation error of the image.

While the cascaded classifier 50 shown in FIG. 3 includes three classifier stages, more or fewer classifier stages can be included to provide finer or coarser resolution of the JPEG compression quality. Accuracy of the classification is generally improved by adding additional classifiers to the cascade. Moreover, configurations other than a cascaded classifier can be used. For example, a parallel classifier can be used, in which the image signature is simultaneously input to all classifier stages.

The cascaded classifier 50 has been trained on an image database containing over 22,000 JPEG-compressed and uncompressed color images. For the purpose of additional evaluation, a script for automatic JPEG detection from the results of an online image search engine has been developed. Accuracy in this case was consistent with predicted accuracy for random queries (such as people, city, car, office, etc.) and so the algorithm is expected to scale well to other types of images.

TABLE I

| Threshold | Q < 60 | 60 ≤ Q < 90 | 90 ≤ Q < 96 | 96 ≤ Q < 99 | Q = 99, 100 | Not JPEG |
|---|---|---|---|---|---|---|
| 0.10 | 99.7% | 99.3% | 98.4% | 98.5% | 98.5% | 71.2% |
| 0.20 | 99.7% | 98.9% | 97.5% | 97.6% | 97.7% | 81.9% |
| 0.30 | 99.7% | 98.6% | 96.9% | 96.8% | 96.8% | 87.2% |
| 0.40 | 99.6% | 98.3% | 96.4% | 95.9% | 95.9% | 90.1% |
| 0.50 | 99.6% | 98.0% | 95.9% | 94.9% | 94.8% | 92.8% |
| 0.60 | 99.5% | 97.7% | 95.1% | 94.0% | 93.3% | 94.9% |
| 0.70 | 99.4% | 97.1% | 94.2% | 92.4% | 91.5% | 96.2% |
| 0.80 | 99.3% | 96.6% | 92.9% | 90.2% | 87.9% | 97.3% |
| 0.90 | 99.1% | 96.2% | 90.2% | 85.3% | 78.8% | 98.0% |
| 0.94 | 98.8% | 95.6% | 87.9% | 80.3% | 70.7% | 98.8% |
| 0.98 | 98.2% | 94.3% | 82.8% | 68.6% | 51.0% | 99.5% |

Table I presents results using five-fold cross-validation over 1,000 randomly generated different folds. Each row indicates the method accuracy for JPEG images compressed at different quality settings (that is, different "Q" values where larger "Q" value corresponds to less aggressive JPEG compression and higher image quality) as well as for uncompressed images, for a given probability threshold on the third classifier 56 of the cascade. Higher probability thresholds imply that fewer images will be classified as a JPEG and, as a consequence, a lower false negative rate and higher false positive rate is achieved. For a probability threshold value of 0.5, the false positive rate was found to be approximately 7% and the false negative rate was found to be about 5% on very high quality images. These false positive and false negative rates decreased substantially as the quality setting decreases below 90.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for classifying an uncompressed image respective to JPEG compression history, the method comprising:
deriving an image signature from the uncompressed image, the image signature being indicative of spatial frequencies content of one or more chrominance components of the uncompressed image including spatial frequencies content associated with previous JPEG compression; and
classifying the image respective to whether the uncompressed image has previously undergone JPEG compression based on analysis of the image signature;
wherein the method is performed by an apparatus for classifying an image respective to JPEG compression history.

2. The method as set forth in claim 1, wherein the deriving comprises:
suppressing spatial frequencies content of the one or more chrominance components that is associated with luminance gradients.

3. The method as set forth in claim 2, wherein the suppressing comprises:
smoothing the one or more chrominance components along high values of a luminance gradient.

4. The method as set forth in claim 2, wherein the suppressing comprises:
weighting the one or more chrominance components based on a corresponding luminance gradient.

5. The method as set forth in claim 1, wherein the deriving an image signature comprises:
generating horizontal and vertical projections of at least one of the chrominance components; and
transforming the horizontal and vertical projections into a frequency space.

6. The method as set forth in claim 5, wherein the deriving an image signature further comprises:
combining the transformed horizontal and vertical projections to produce a combined projection.

7. The method as set forth in claim 5, wherein the generating of horizontal and vertical projections and the transforming thereof is performed for two chrominance components, and the transforming further comprises:
combining one or more of the transformed horizontal and vertical projections of the two chrominance components to produce a combined projection.

8. The method as set forth in claim 1, further comprising:
for each uncompressed image determined to have previously undergone JPEG compression, estimating an image re-sizing subsequent to the previous JPEG compression based on frequency values of JPEG compression artifact features in the image signature.

9. The method as set forth in claim 1, wherein the classifying comprises:
processing the image signature with a cascaded classifier, the processing terminating when either a classifier stage of the cascaded classifier determines that the uncompressed image has previously undergone JPEG compression or no classifier stage determines that the uncompressed image has previously undergone JPEG compression.

10. The method as set forth in claim 9, further comprising:
tagging each uncompressed image determined to have previously undergone JPEG compression with a JPEG quality based on which cascaded classifier stage made the determination.

11. The method as set forth in claim 9, further comprising:
training each classifier stage of the cascaded classifier using a training set including uncompressed images that have not previously undergone JPEG compression and uncompressed images that have previously undergone JPEG compression.

12. The method as set forth in claim 11, wherein at least two classifier stages of the cascaded classifier employ different classification algorithms.

13. The method as set forth in claim 11, wherein each successive stage of the cascaded classifier is trained using a sub-set of uncompressed images of the training set that are not classified as having previously undergone JPEG compression by earlier trained classifier stages of the cascaded classifier.

14. An apparatus for classifying an image respective to whether the image has undergone JPEG compression, the apparatus comprising:
an image signature deriver that derives a spatial frequency-based image signature from at least one or more chrominance components of the image; and
a classifier that classifies the image respective to whether the image has undergone JPEG compression based on analysis of the spatial frequency-based image signature.

15. The apparatus as set forth in claim 14, wherein the image signature deriver derives the image signature with suppression of at least some spatial frequencies content not associated with JPEG blocking artifacts.

16. The apparatus as set forth in claim 15, wherein the image signature deriver comprises:
a fast Fourier transform (FFT) that transforms one or more image components to a spatial frequency space.

17. The apparatus as set forth in claim 16, wherein the one or more FFT-transformed image components are selected from a group consisting of a luminance component, a first chrominance component, and a second chrominance component.

18. The apparatus as set forth in claim 14, wherein the classifier comprises:
a plurality of connected classifier stages.

19. The apparatus as set forth in claim 18, wherein the plurality of classifier stages are cascaded, and each successive classifier stage is more likely to classify the image as having JPEG compression than the previous classifier stage.

20. The apparatus as set forth in claim 18, further comprising:
a tagger that tags the image with a JPEG quality indication corresponding to a classifier stage that classifies the image as having undergone JPEG compression.

21. An image classification method comprising: deriving a spatial frequency-based image signature from one or more chrominance components of an image that is not JPEG compressed, the image signature comprising a spectral representation of the digital image; and classifying the image respective to whether the image has previously undergone JPEG compression based on the spatial frequency-based image signature comprising a spectral representation of the digital image;
wherein the image classification method is performed by an image classification apparatus.

22. The image classification method as set forth in claim 21, wherein the deriving further comprises:

adjusting the one or more chrominance components based on a corresponding luminance component to suppress chrominance component features attributable to luminance component gradients.

23. The image classification method as set forth in claim 21, wherein the deriving comprises:

computing a spatial frequencies representation of one or more projections of components of the image.

24. The image classification method as set forth in claim 21, wherein the classifying comprises:

training a classifier using a training set of image signatures derived from a set of uncompressed images and images that have been JPEG compressed; and applying the classifier to the derived spatial frequency-based image signature to classify the image respective to whether JPEG compression has been performed.

25. The image classification method as set forth in claim 21, further comprising:

generating a plurality of rotated images from the image, the deriving and classifying being repeated for each of the plurality of rotated images; and classifying the unrotated image as having previously undergone JPEG compression if at least one of the plurality of rotated images is classified as having previously undergone JPEG compression.

* * * * *